United States Patent [19]

Pieper et al.

[11] Patent Number: 5,035,735

[45] Date of Patent: Jul. 30, 1991

[54] PROCESS FOR VITRIFYING ENVIRONMENTALLY HAZARDOUS WASTE MATERIAL IN A GLASS MELTING FURNACE

[75] Inventors: Helmut Pieper; Hartmut Zschocher, both of Lohr; Helmut Sorg, Glattbach, all of Fed. Rep. of Germany

[73] Assignee: Beteiligungen Sorg GmbH & Co. KG, Lohr, Fed. Rep. of Germany

[21] Appl. No.: 450,346

[22] Filed: Dec. 13, 1989

Related U.S. Application Data

[63] Continuation-in-part of Ser. No. 303,841, Jan. 30, 1989, Pat. No. 4,948,411.

[30] Foreign Application Priority Data

Dec. 13, 1988 [DE] Fed. Rep. of Germany ....... 3841918
Feb. 3, 1989 [DE] Fed. Rep. of Germany ....... 3903194
Apr. 14, 1989 [DE] Fed. Rep. of Germany ....... 3912311

[51] Int. Cl.$^5$ ................................................ C03B 5/16
[52] U.S. Cl. .......................................... 65/134; 65/27; 65/136; 423/DIG. 20; 501/155
[58] Field of Search ...................... 65/27, 29, 134, 136; 501/27, 30, 32, 155; 423/DIG. 20

[56] References Cited

U.S. PATENT DOCUMENTS

| | | | |
|---|---|---|---|
| 4,312,658 | 1/1982 | Mayer | 65/29 |
| 4,478,628 | 10/1984 | Dunn | 65/29 |
| 4,632,690 | 12/1986 | Colwell, Jr. et al. | 65/134 |
| 4,652,289 | 3/1987 | Drouet et al. | 65/27 |
| 4,666,490 | 5/1987 | Drake | 65/27 |
| 4,678,493 | 7/1987 | Roberts et al. | 65/134 |
| 4,820,328 | 4/1989 | Roberts et al. | 65/134 |
| 4,944,785 | 7/1990 | Sorg et al. | 65/136 |

*Primary Examiner*—Joye L. Woodard
*Attorney, Agent, or Firm*—Felfe & Lynch

[57] ABSTRACT

Process for vitrifying environmentally hazardous waste material in a glass melting furnace includes forming a batch including the waste material and no more than 30 weight percent additives including phonolite and $SiO_2$ containing substances. A gall layer 2-5 cm thick including alkali salts or alkaline earth salts is produced on the molten glass, and batch is added so that a batch layer over 5 cm thick is formed on top of the gall layer. After the batch layer is formed, the molten glass is heated solely by electrodes, and the thickness of the batch layer is maintained to produce a steep enough temperature gradient therein so that the furnace atmosphere remains relatively cool, and substantially all of the condensable components which emerge from the molten glass condense in the batch layer.

16 Claims, No Drawings

PROCESS FOR VITRIFYING ENVIRONMENTALLY HAZARDOUS WASTE MATERIAL IN A GLASS MELTING FURNACE

This application is a continuation-in-part of U.S. application Ser. No. 303,841, filed Jan. 30, 1989 and now U.S. Pat. No. 4,948,411 which is incorporated herein by reference.

The invention relates to a process for operating a glass melting furnace, particularly for vitrifying environmentally hazardous waste material such as asbestos or asbestos containing demolition material, sewage sludge, varnish sludge, ashes, and filter dust. During operation, batch including the waste material and additives containing $SiO_2$ is fed into the furnace and forms a batch layer on top of the molten glass, which is heated by electrodes therein.

It is known to convert waste material which occurs in the form of toxic or radioactive sludge or suspensions, for example, into glass by means of melting after adding additives and after mixing into batch. Some of the waste material is dissolved in the melt, i.e., it is chemically decomposed, and the rest is firmly incorporated in the glass when the latter solidifies after withdrawal from the furnace. It is advantageous that glass is difficult to leach out, so that release of components contained in the glass can occur only to a very small extent. This permits a disposal without problems or further manufacture of bodies made from this glass. Processes of this kind are known, for example, from German patent 26 31 220 or from U.S. Pat. No. 4,666,490.

A problem which often occurs when vitrifying waste materials is that these waste materials often contain a high percentage of chlorides and sulfates; these are absorbed by the melt only to a small extent during melting, even when the glass melt is fully saturated with chlorides and sulfates. This leads to the disadvantageous formation of large amounts of exhaust gas which develop from the chlorides and sulfates, particularly Cl, HCl, $SO_2$, and $SO_3$. Further, it is disadvantageous that evaporation causes heavy metals and alkali metals to enter the exhaust gas from the glass melt. This requires a purification which involves a great amount of labor and cost which in connection with the high energy consumption negatively affects the cost-effectiveness ratio of the process.

SUMMARY OF THE INVENTION

It is hence an object of the invention to find a process of the aforesaid kind wherein the amount of exhaust gas and the energy consumption are reduced and wherein the cost-effectiveness ratio is improved.

The object is accomplished by a process wherein a liquid alkali salt or alkaline earth salt gall layer (a layer of glass gall) is produced on the surface of the glass melt. The layer is maintained at a thickness corresponding to the respective operational conditions of the furnace by withdrawing a respectively required amount. Alternatively or supplementally, the object is accomplished by maintaining the batch layer at a thickness which corresponds to the respective operational conditions of the furnace, by controlled supply and distribution of a suitably composed batch.

The gall layer permits a substantially improved heat transfer into the batch to be molten, which reduces the amount of energy required for the working of the process and increases the throughput which can be achieved with the process. Moreover, large percentages of the substances emerging from the melting process, particularly the chlorides and sulfates, are incorporated in the gall layer so that the amount of exhaust gas which develops is substantially reduced. Labor and cost for the purification of the exhaust gas are thus significantly reduced. After cooling and solidification the gall which was withdrawn from the glass melting furnace can easily be treated to form dry and clean salts and then be subject to further manufacture or be deposited on a waste disposal site. The metal oxides which develop during the melting are practically completely absorbed in the glass melt with no particular measures required and are thus firmly incorporated in the glass body to be formed. Finally, in the new process the gall layer and/or the defined batch layer avoid an evaporation of heavy metals and alkali components at the surface of the glass melt. The amounts of exhaust gas and the harmfulness are thus further reduced.

DETAILED DESCRIPTION OF THE PREFERRED EMBODIMENT

The process further suggests to adjusting the thickness of the batch layer which rests on the liquid glass melt so that a temperature gradient results in the layer providing a low temperature in the top furnace so as to cause all condensable components which emerge from the glass melt to condense in the batch layer and directly reintroduce these components during the process. The amount of developing exhaust gas is thus reduced and the formation of several other toxic substances which occur in the exhaust gas of conventional processes is reduced from the outset, which in turn simplifies the purification of this exhaust gas.

Advantageously, the thickness of the gall layer is adjusted such that a high heat transfer is achieved between the glass melt and the powdery batch layer. In most of the practical applications, this corresponds to a preferred thickness of the gall layer between 2 and 5 cm, approximately. Corresponding thereto, is an optimum layer thickness of the batch layer of more than 5 cm.

The gall layer preferably consists of a sulfate and/or chloride of calcium, magnesium, sodium, potassium, or lithium, or a mixture of these compounds. These compositions offer the advantage of keeping low the additional costs for the production thereof, particularly for special additives. These additional costs are very low as compared to the costs of purification of the exhaust gas such that the operation of the entire process is less expensive. The compounds $CaSO_4$, $CaCl_2$, $MgSO_4$ and $MgCl_2$ are added during the melting process with the waste and/or as a separate additive, and the compounds $NaSO_4$, $NaCl$, $K_2SO_4$, $KCl$, $Li_2SO_4$ and $LiCl$ are produced by reaction with the first mentioned compounds.

With respect to the batch to be charged into the glass melting furnace, the invention suggests that it be a batch including the waste materials and extrusive rocks, particularly phonolite, and $SiO_2$-containing substances, particularly silica sand. Geologically, these additives are widespread, easy to recover and to handle, and also inexpensive. Alternatively or supplementary, it is possible to use cullet as an $SiO_2$-containing additive. Making use of the process in accordance with the present invention, it can be expected that together, the extrusive rocks and the $SiO_2$-containing substances make up a maximum of only 30 weight percent of the total batch. Hence, the additives are only a minor part of the batch whereas the main part of the batch is formed by the waste materials. The present process can hence also be used to economically vitrify large amounts of waste material.

Environmental pollution can further be reduced in that the energy required during operation of the glass melting furnace is exclusively generated by means of the heating electrode which extends into the glass melt. The melting heat is hence supplied to the batch from the glass melt via the gall layer. The batch thus remains relatively cool in its upper part which also contributes to preventing an evaporation of batch components and ensures a condensation of the vapors escaping from the glass melt and the gall layer. It is also possible to provide heating devices for fossil fuel, however, these would only be employed during the start-up phase of the glass melting furnace in order to produce a first glass melt charge, preferably from a batch which is free of waste material.

Further, it is an object of the process to withdraw the gall, when necessary, from the glass melting furnace in an essentially horizontal plane from a second outlet and to separately withdraw the molten glass from a first outlet while maintaining a constant glass melt level in the furnace. Interference of the withdrawal procedures is thus avoided, permitting withdrawal to be carried out with high accuracy with respect to the glass melt level and the gall layer thickness.

In this connection it is also possible to withdraw the glass from the inside of the furnace directly from the depth of the melt. This ensures that disturbances or turbulences at the surface of the melt are avoided. A first outlet which is a bottom outlet preferred possibility for withdrawing the melt from the depth.

Further, the invention suggests that the furnace outlets for withdrawing gall and withdrawing glass be heated. This ensures that there is no undesired premature solidification of gall or glass and that the level of the glass melt and the gall layer thickness can be maintained and controlled with the required accuracy even without a direct measuring of the height.

In order to avoid mechanically-operated means for controlling the gall layer thickness and the glass melt level, but to still be able to directly affect these parameters, the invention suggests that the amount of withdrawn gall and, hence, the gall layer thickness in the glass melting furnace are controlled by applying a more or less strong vacuum to the corresponding outlet. It further suggests that the amount of withdrawn glass and, hence, the height of the glass melt level in the glass melting furnace is controlled by applying a more or less strong vacuum to the corresponding outlet. This permits a very simple, safe and sufficiently accurate control of the gall layer thickness and the glass melt level in the glass melting furnace.

An alternative embodiment of the process suggests that the required withdrawal of gall from the glass melt furnace be carried out discontinuously by tapping the furnace. This variant can be carried out with little technical complexity involved and is known in a similar metallurgical process.

Finally, the invention suggests that from time to time, heavy metal melt is withdrawn from the lowest point of the glass melting furnace where it has gathered. This avoids an unnecessary charge of the molten and withdrawn glass with heavy metals. The withdrawn heavy metals can either be separately deposited on a waste disposal site or be further manufactured after a conditioning treatment.

Generally, the new process permits a comparatively economical vitrification of environmentally harmful waste material while operating under high safety standards and the process itself and the resulting products are low environmental load.

We claim:

1. Process for vitrifying environmentally hazardous waste material in a glass melting furnace, comprising:
   forming a glass melt having a surface in the furnace;
   forming a batch containing the waste material and an additive consisting of at least one compound selected from the group consisting of phonolite and $SiO_2$ containing materials;
   adding the batch to the furnace so that a batch layer is formed on the molten glass;
   heating the molten glass after the batch layer is formed thereon, solely by devices in the molten glass;
   producing a gall layer of glass gall on the surface of the glass melt between the glass melt and the batch layer, said glass gall consisting essentially of at least one of an alkali salt and an alkaline earth salt;
   withdrawing glass gall from the gall layer as necessary and controlling the composition, supply, and distribution of the batch so that the gall layer and the batch layer are maintained at respective thicknesses which are sufficient to maintain the furnace atmosphere above the batch layer at a sufficiently low temperature so that substantially all of the condensable components which emerge from the molten glass and the gall layer condense in the batch layer; and
   withdrawing the molten glass from the furnace via a first outlet means.

2. Process in accordance with claim 1 wherein said glass gall consists essentially of at least one compound selected from the group consisting of
   $CaSO_4$, $CaCl_2$, $MgSO_4$, and $MgCl_2$ added during the melting process with said waste and/or as a separate additive, and
   $Na_2SO_4$, $NaCl$, $K_2SO_4$, $KCl$, $Li_2SO_4$, and $LiCl$ produced by reaction with said $CaSO_4$, $CaCl_2$, $MgSO_4$, and $MgCl_2$.

3. Process in accordance with claim 1 characterized in that the thickness of the gall layer is from 2 cm to 5 cm.

4. Process in accordance with claim 1 wherein the thickness of the batch layer is more than 5 cm.

5. Process in accordance with claim 1 wherein during operation of the glass melting furnace, the required thermal energy is generated exclusively electrically by means of heating electrodes which extend into the glass melt.

6. Process in accordance with claim 1 wherein the necessary withdrawal of gall is carried out on a essentially horizontal plane and that the melted glass is separately withdrawn from the furnace while maintaining a constant level of the glass melt.

7. Process in accordance with claim 1 wherein the glass is withdrawn directly from inside the furnace from the depth of the melt.

8. Process in accordance with claim 7 wherein the first outlet means is a bottom outlet means.

9. Process in accordance with claim 1 wherein a second outlet means is provided for withdrawing the gall.

10. Process in accordance with claim 9 wherein the amount of withdrawn gall and, hence, gall layer thickness in the glass melting furnace are controlled by applying a strong vacuum at the second outlet means.

11. Process in accordance with claim 9 wherein the amount of withdrawn glass and, hence, the height of the glass melt level in the glass melting furnace are controlled by applying a strong vacuum at the first outlet means.

12. Process in accordance with claim 9 wherein the necessary withdrawal of gall from the second outlet means of the glass melting furnace is carried out discontinuously by means of tapping the furnace.

13. Process in accordance with claim 9 wherein the first and second outlet means are heated.

14. Process in accordance with claim 11 wherein the furnace has a bottom where a heavy metal melt gathers, and from time to time, the heavy metal melt is withdrawn from the furnace.

15. Process in accordance with claim 1 wherein exhaust gas emerging from the furnace falls within the range of 80° to 400° C.

16. Process as in claim 15 exhaust gas emerging from the furnace falls within the range from 100° to 200° C.

* * * * *

UNITED STATES PATENT AND TRADEMARK OFFICE
CERTIFICATE OF CORRECTION

PATENT NO. : 5,035,735
DATED : July 30, 1991
INVENTOR(S) : Helmut Pieper et al.

It is certified that error appears in the above-identified patent and that said Letters Patent is hereby corrected as shown below:

Col. 4, line 7, delete "are low" and insert --are a low--.

Col. 6, line 5 (Claim 14), delete "claim 11" and
    insert --claim 1--.

Signed and Sealed this

Twenty-second Day of June, 1993

Attest:

MICHAEL K. KIRK

Attesting Officer     Acting Commissioner of Patents and Trademarks